United States Patent [19]
Kitano

[11] Patent Number: 6,166,315
[45] Date of Patent: Dec. 26, 2000

[54] DEVICE FOR PROCESSING A MICROPHONE SIGNAL OF A KARAOKE APPARATUS

[75] Inventor: Mikio Kitano, Hamamatsu, Japan

[73] Assignee: Yamaha Corporation, Hamamatsu, Japan

[21] Appl. No.: 09/396,094

[22] Filed: Sep. 14, 1999

[30] Foreign Application Priority Data

Sep. 22, 1998 [JP] Japan .................................. 10-286084

[51] Int. Cl.[7] .............................. G09B 5/00; G10H 1/02; G10H 1/36; H03G 3/00
[52] U.S. Cl. ........................ 84/610; 84/630; 84/DIG. 26; 381/63; 434/307 A
[58] Field of Search ..................... 84/609–614, 626–633, 84/DIG. 26; 381/63, 64, 65; 434/307 A

[56] References Cited

U.S. PATENT DOCUMENTS

| | | | |
|---|---|---|---|
| 5,739,452 | 4/1998 | Nagata | 84/610 |
| 5,753,845 | 5/1998 | Nagata et al. | 84/626 |
| 5,902,950 | 5/1999 | Kato et al. | 84/610 |

*Primary Examiner*—Stanley J. Witkowski
*Attorney, Agent, or Firm*—Pillsbury Madison & Sutro LLP

[57] ABSTRACT

In accordance with a kind of effect, an effect adding section (38) adds an original microphone signal with an effect signal and outputs the added signal, or outputs an effect signal in place of the original microphone signal. A mixing section (42) mixes the effect signal and the original microphone signal at a variable mixing ratio. The mixed signal is supplied to an echo signal generating circuit (20) to generate an echo signal. An output signal of the effect adding section (38) and the echo signal output from an echo adding section (40) are mixed by a mixing circuit (18). In the case in which both an effect and an echo are added such that the microphone signal and the effect signal are added and then output, the mixing section (42) reduces the mixing ratio of the effect signal, whereby the effect is prevented from being excessively increased.

15 Claims, 3 Drawing Sheets

DEVICE FOR PROCESSING A MICROPHONE SIGNAL OF A KARAOKE APPARATUS

BACKGROUND OF THE INVENTION

1. Field of the Invention

The present invention relates to a device for processing a microphone signal of a karaoke apparatus, and more particularly to a device in which effects in the case where both an effect and an echo are added to a microphone signal can be rationalized.

The present application is based on Japanese Patent Application No. Hei. 10-286084, which is incorporated herein by reference.

2. Description of the Related Art

A recent karaoke apparatus has a function of adding various effects and echoes to a microphone signal (vocal sound). For example, the following kinds of effects are used.

(a) Harmonizing Function

The pitch of the microphone signal (main melody) is changed on the basis of melody data of each chorus part previously added to music piece data, to produce a song signal of another chorus part. The produced song signal is reproduced by being mixed with the original microphone signal, thereby enabling even a single singer to attain a chorus effect. In some cases, the number of parts to be added can be arbitrarily selected in the range of 1 to about 4.

(b) Doubling Function

The microphone signal is appropriately corrected to produce a signal of the same interval. The produced signal is reproduced by being mixed with the original microphone signal, thereby providing the singing voice with power.

(c) Voice Changing Function

The pitch of the microphone signal is converted to produce a signal of a voice of the opposite sex. The produced signal is also reproduced in place of the original microphone signal. As a result, the voice of a male is converted into that of a female or the voice of a female is converted into that of a male.

(d) Virtual Duet Function

In a duet piece consisting of a male voice part, a female voice part, and a mixed voice part, for the part which is identical with the part of the singer, the microphone signal is reproduced as it is. Meanwhile, for the part of the opposite sex, the pitch of the microphone signal is converted into that of a voice of the opposite sex. Also, for the mixed voice part, a signal which is obtained by converting the microphone signal into a voice of the opposite sex is reproduced while simultaneously reproducing the microphone signal as it is. A single singer is thereby enabled to realize a mixed duet.

(e) Assist Function

The main melody (guide melody) which was previously added to the music piece data is compared with the microphone signal, and the deviation of the interval of the microphone signal is corrected by pitch conversion so that the corrected microphone signal is reproduced in place of the original microphone signal, thereby enabling the song to be heard very well.

FIG. 2 shows the configuration of a portion of a karaoke apparatus which is used for adding an effect and an echo. In this figure, only a portion of one of the right and left channels is shown.

In the karaoke apparatus, music piece data reproduced from a recording medium are supplied to an accompaniment sound generating circuit 10, and a musical sound signal of accompaniment sound is generated. A signal of singing sound of the singer which is collected by a vocal microphone (a microphone signal) is branched in two directions, and the branched signals are supplied in parallel to a dry muting circuit 12 and an effect signal generating circuit 14. The dry muting circuit 12 enables or disables the microphone signal to pass through the dry muting circuit. When the dry mute is off, the pass is enabled; when the dry mute is on, the pass is disabled. The effect signal generating circuit 14 generates an effect signal for the microphone signal, and is configured by, for example, connecting in parallel four routes each having a DSP (Digital Signal Processor). An output signal of the dry muting circuit 12, and that of the effect signal generating circuit 14 are mixed with each other by a mixing circuit 16. An output signal of the mixing circuit 16 is supplied to an echo signal generating circuit 20 to generate an echo signal.

A mixing circuit 18 mixes the generated echo signal with the signal of the mixing circuit 16 to which the echo is not added, and outputs the mixed signal as a final signal of the singing sound. A mixing circuit 22 mixes the signal of the singing sound with the signal of the accompaniment sound. An output signal of the mixing circuit 22 is amplified by an amplifier 24 and the amplified signal is reproduced by a loudspeaker 26.

In response to an operation of the user, an effect operating section 28 conducts various instruction operations such as the on/off state of each effect, selection of the kind of effect mode, and adjustment of the additional amount of the effect. For example, the kinds of effects include the harmonizing function, the doubling function, the voice changing function, the virtual duet function, and the assist function which are described above. The additional amount of the effect corresponds, for example, to the volume of an effect signal in the harmonizing function, the doubling function, or the like, the number of parts to be added in the harmonizing function, the number of superimposed corrected sounds in the doubling function, etc. An effect control information extracting circuit 30 extracts effect control information which is contained, for example, in music piece data as note information of a MIDI signal. For example, the effect control information includes main melody (guide melody) information used in the assist function, melody information of a part to be added in the harmonizing function, melody information of each part used in the virtual duet function, etc. An effect controlling circuit 32 controls the effect signal generating circuit 14 in accordance with various instructions in the effect operating section 28 and the effect control information, to generate an effect signal corresponding to the instructions and the effect control information.

In response to an operation of the user, an echo operating section 34 conducts various instruction operations such as the on/off state of each echo, selection of the kind of echo mode, and adjustment of the echo level. An echo controlling circuit 36 controls the echo signal generating circuit 20 in accordance with various instructions in the echo operating section 34, to generate an echo signal corresponding to the instructions.

In the circuit of FIG. 2, in accordance with the kind of effect, the dry muting circuit 12 and the effect signal generating circuit 14 are controlled in the following manner in accordance with the kind of effect.

(a) Harmonizing Function

The dry muting circuit 12 is turned off to enable the original microphone signal to pass through the circuit. The effect signal generating circuit 14 converts the pitch of the original microphone signal using the four routes, to generate signals of the parts to be added, and outputs the part which is designated by the operation of the user. The mixing circuit 16 mixes the original microphone signal (the main melody) with the signal of the part to be added, and outputs the mixed signal.

(b) Doubling Function

The dry muting circuit 12 is turned off to enable the original microphone signal to pass through the circuit. The effect signal generating circuit 14 generates a signal which is obtained by correcting the original microphone signal by, for example, one of the routes, and outputs the corrected signal. The mixing circuit 16 mixes the original signal with the corrected signal and outputs the mixed signal.

(c) Voice Changing Function

The dry muting circuit 12 is turned on to disable the original microphone signal from passing through the circuit. The effect signal generating circuit 14 generates a signal which is obtained by converting the pitch of the original microphone signal using one of the routes to that of a voice corresponding to instructions given by the user (e.g., conversion from a male voice to a female voice or from a female voice to a male voice), and outputs the pitch-converted signal. The mixing circuit 16 outputs only the pitch-converted signal.

(d) Virtual Duet Function

The dry muting circuit 12 is turned on to disable the original microphone signal from passing through the circuit. The effect signal generating circuit 14 generates a signal which is obtained by converting the pitch of the original microphone signal to the voice of the opposite sex using one of the routes in accordance with instructions relating to the sex (i.e., a male singing or a female singing) and given by the user. The circuit 14 then enables the original microphone signal to be passed through another route without undergoing conversion, and, with the progress of accompaniment sound, outputs the signal of the corresponding part in accordance with the information indicative of a male voice part, a female voice part, or a mixed voice part and given in the effect control information. The mixing circuit 16 outputs only the signals output from the effect signal generating circuit 14.

(e) Assist Function

The dry muting circuit 12 is turned on to disable the original microphone signal from passing through the circuit. The effect signal generating circuit 14 generates a signal which is obtained by correcting the original microphone signal in accordance with the guide melody by one of the routes, and outputs the corrected signal. The mixing circuit 16 outputs only the corrected signal.

In the circuit of FIG. 2, the generation of the echo signal by the echo signal generating circuit 20 is conducted in accordance with only the instructions given by the echo operating section 34, and irrespective of the kind of effect. In this case, in an effect mode such as the harmonizing function or the doubling function in which the original signal and an effect signal are added together and a result of the addition is output, even this effect is sufficient for attaining a reverberation effect. When an echo is further added, however, it is often that the effect (reverberation and the like) is excessively increased and listening or singing is hardly conducted.

SUMMARY OF THE INVENTION

It is an object of the present invention to provide a device for processing a microphone signal of a karaoke apparatus-which can solve the problem of the related art, and in which effects in the case where both an effect and an echo are added to a microphone signal can be rationalized.

The device of the present invention comprises: an effect adding section which conducts an effect adding process wherein a signal in which a pitch is changed with respect to an input microphone signal or a signal which is appropriately corrected with respect to the microphone signal is produced, the signal is added to the input microphone signal, and a result of the addition is output; an echo adding section which conducts an echo adding process wherein an echo is added to an output signal of the effect adding section, and a result of the addition is output; an effect on/off instructing section that instructs whether the microphone signal undergoes the effect adding process and then enters the echo adding section, or directly enters the echo adding section without undergoing the effect adding process; and a controlling circuit which, in accordance with effect on/off instructions of the effect on/off instructing section, turns on/off the effect adding process of the effect adding section, and, when an effect on instruction is given, reduces an additional amount of the echo which is to be added by the echo adding section, as compared with the case where an effect off instruction is given.

According to the present invention, when an effect of adding an effect signal with an original microphone signal and reproducing a result of the addition is added and an echo is further added, the additional amount of the echo is reduced as compared with the case where the effect is not added and only the echo is added. Therefore, the effect is prevented from being excessively increased.

The device of the present invention comprises: an effect adding section which conducts an effect adding process wherein a signal in which a pitch is changed with respect to an input microphone signal or a signal which is appropriately corrected with respect to the input microphone signal is produced, the signal is output in place of the original microphone signal, the signal is added to the microphone signal, and a result of the addition is output; an echo adding section which conducts an echo adding process wherein an echo is added to an output signal of the effect adding section, and a result of the addition is output; an effect kind instructing section that instructs a kind of effect which is to be added by the echo adding section; and a controlling circuit which, in accordance with the effect kind which is instructed by the effect kind instructing section, sets the effect which is to be added by the effect adding section to have corresponding contents, and, in accordance with the instructed effect kind, changes an additional amount of the echo which is to be added by the echo adding section.

According to the present invention, when both an effect and an echo are to be added, the additional amount of the echo is changed in accordance with the kind of effect to be added. Therefore, the effect can be rationalized. When an effect of a kind in which an effect signal is added with an original microphone signal and a result of the addition is reproduced is added and an echo is further added, the additional amount of the echo is reduced as compared with the case where an effect of a kind in which an effect signal is reproduced in place of a microphone signal is added and the echo is further added. Therefore, the effect is prevented from being excessively increased.

When, in accordance with effect control information which is obtained with the progress of accompaniment sound, contents of the effect are changed, the additional amount of the echo may be changed according to this change. When the additional amount of the effect is separately instructed, the additional amount of the echo may be changed according to the instructed additional amount of the effect. When the additional amount of the effect is increased, for example, that of the echo is reduced.

The change of the additional amount of the echo by the echo adding section may be realized by changing an item such as the input level of the output signal of the effect adding section which is to be supplied to the echo adding section, and a delay time, a feedback gain, and an output level of the echo adding section. For example, reduction of the additional amount of the echo can be realized by reducing one or more of the items. In the case where an echo is to be added to a signal which is obtained by mixing an effect signal with an original microphone signal at a variable mixing ratio, the additional amount of the echo can be changed by changing the mixing ratio in accordance with the on/off state of the effect or the kind of effect.

The device of the present invention comprises: a dry muting circuit which enables or disables an input microphone signal to pass through the dry muting circuit; an effect signal generating circuit which is connected in parallel with the dry muting circuit, and which generates an effect signal for the microphone signal; a first mixing circuit which mixes signals on input and output sides of the effect signal generating circuit with each other, at a variable mixing ratio; an echo signal generating circuit which generates an echo signal from an output signal of the first mixing circuit; a second mixing circuit which mixes an output signal of the dry muting circuit, an output signal of the effect signal generating circuit, and an output signal of the echo signal generating circuit with one another; an effect kind instructing section that instructs a kind of an effect; and a controlling circuit which, in accordance with the effect kind which is instructed by the effect kind instructing section, turns on/off the dry muting circuit and sets contents of the effect signal which is to be generated by the effect signal generating circuit, and, in accordance with the instructed effect kind, changes the mixing ratio of the first mixing circuit.

According to the present invention, when both an effect and an echo are to be added, the additional amount of the echo is changed in accordance with the kind of effect to be added. Therefore, the effect can be rationalized. For example, in the case where both an effect to be conducted in a state in which the dry muting circuit is turned off (the input microphone signal is output as it is) and an echo are to be added, the mixing ratio of the effect signal which is mixed by the first mixing circuit is reduced as compared with the case where the dry muting circuit is turned on (the input microphone signal is not output), whereby the effect is prevented from being excessively increased.

When, in accordance with effect control information which is obtained with the progress of accompaniment sound, contents of the effect are changed, the mixing ratio of the effect signal in the first mixing circuit may be changed according to this change. When the kind of effect is separately instructed, the mixing ratio of the effect signal in the first mixing circuit may be changed according to the instructed kind of effect. When the echo level is separately instructed (including the on/off state of the echo), the mixing ratio of the effect signal in the first mixing circuit may be changed according to the echo level (when the echo level is increased, for example, the mixing ratio of the effect signal is reduced). When the generating amount of the effect signal is separately instructed, the mixing ratio of the effect signal in the first mixing circuit may be changed according to the generated amount of the effect signal. When the generated amount of the effect signal is increased, for example, the mixing ratio of the effect signal is reduced.

DETAILED DESCRIPTION OF THE PREFERRED EMBODIMENT

Figure 1:
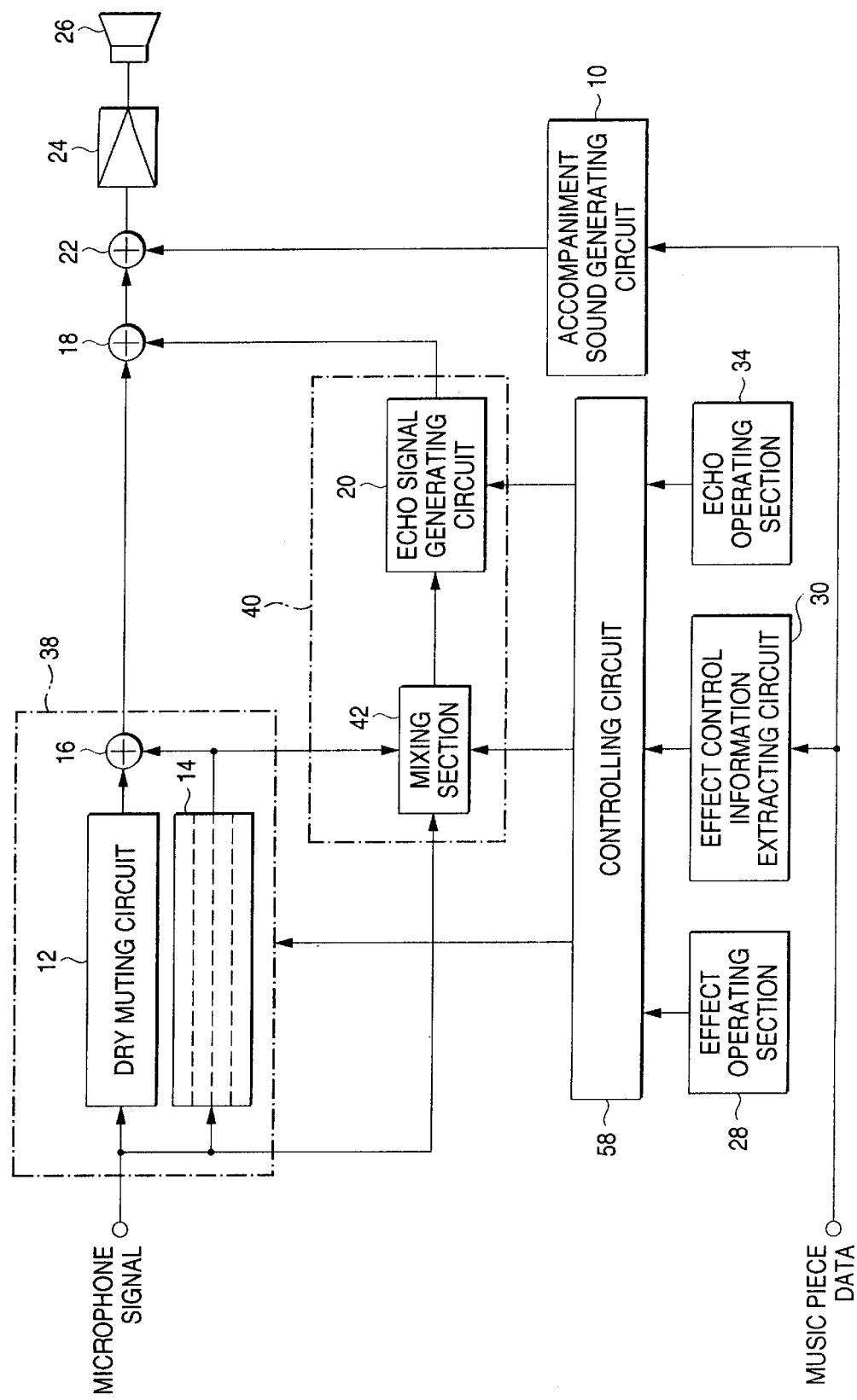
FIG. 1 is a block diagram showing an embodiment of the present invention.
Figure 2:
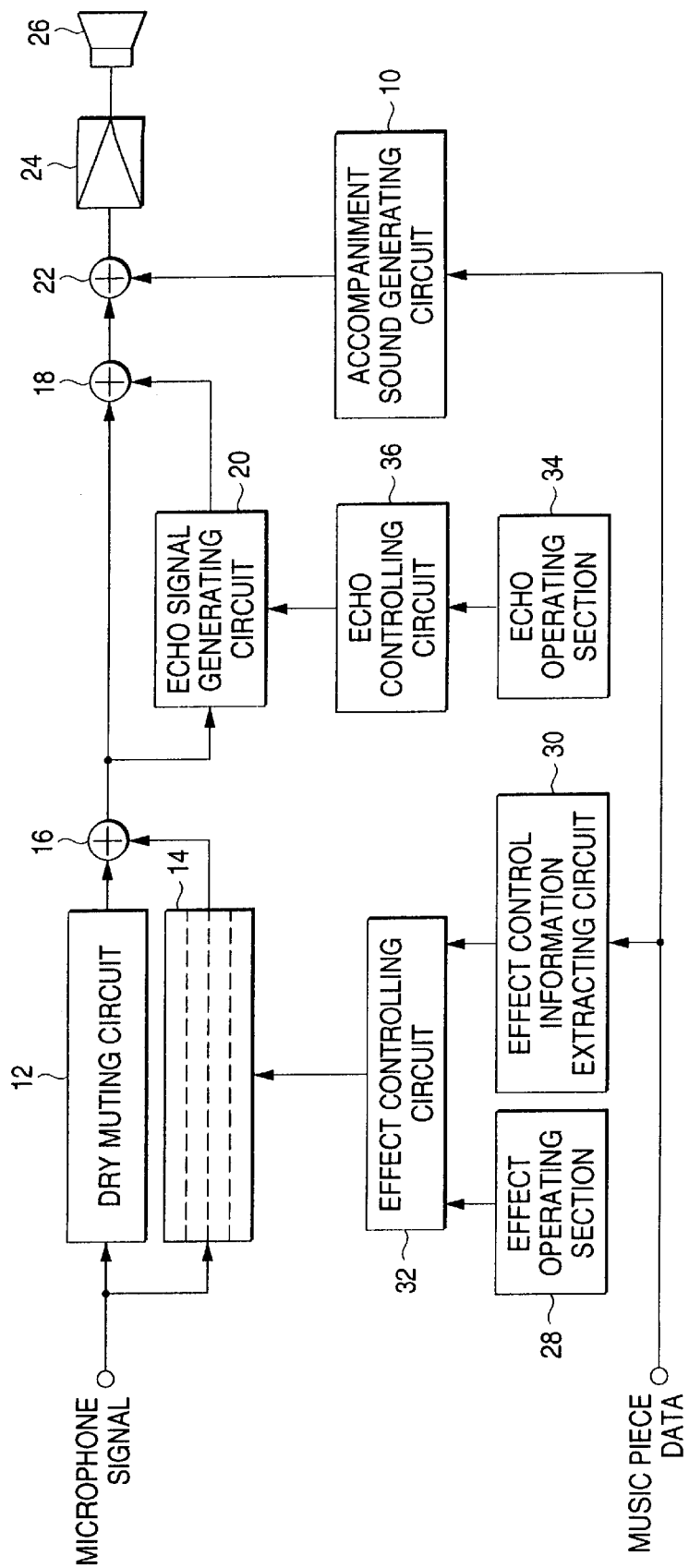
FIG. 2 is a block diagram showing a circuit of the related art.

FIG. 1 shows an embodiment of the present invention. In FIG. 1, the right and left channels are shown in a simplified and integrated manner. A/D and D/A conversions can be conducted at arbitrary portions, and hence are not shown in the figure. The portions identical with those of FIG. 2 are denoted by the same reference numerals. In the embodiment, a mixing section 42 serves as the first mixing circuit, and the mixing circuits 16 and 18 serve as the second mixing circuit.

In the karaoke apparatus, music piece data (digital data) reproduced from a recording medium is supplied to the accompaniment sound generating circuit 10, and a musical sound signal of accompaniment sound is generated. A signal of singing sound of the singer which is collected by a vocal microphone (a microphone signal) is supplied to an effect adding section 38. In the effect adding section 38, the signal is branched in two directions, and the branched signals are supplied in parallel to the dry muting circuit 12 and the effect signal generating circuit 14. The dry muting circuit 12 enables or disables the microphone signal to pass or from passing through the dry muting circuit. The effect signal generating circuit 14 generates an effect signal for the microphone signal, and is configured by, for example, connecting in parallel four routes each having a DSP. Among the four routes, two routes are allocated to the left channel, and the remaining two routes to the right channels. An output signal of the dry muting circuit 12, and that of the effect signal generating circuit 14 are mixed with each other by the mixing circuit 16.

In an echo adding section 40, the mixing section 42 (the first mixing circuit) mixes an effect signal output from the effect signal generating circuit 14 with an input signal (the original microphone signal) of the effect signal generating circuit 14 at a variable mixing ratio. An output signal of the mixing section 42 is supplied to the echo signal generating circuit 20 to generate an echo signal.

Figure 3:
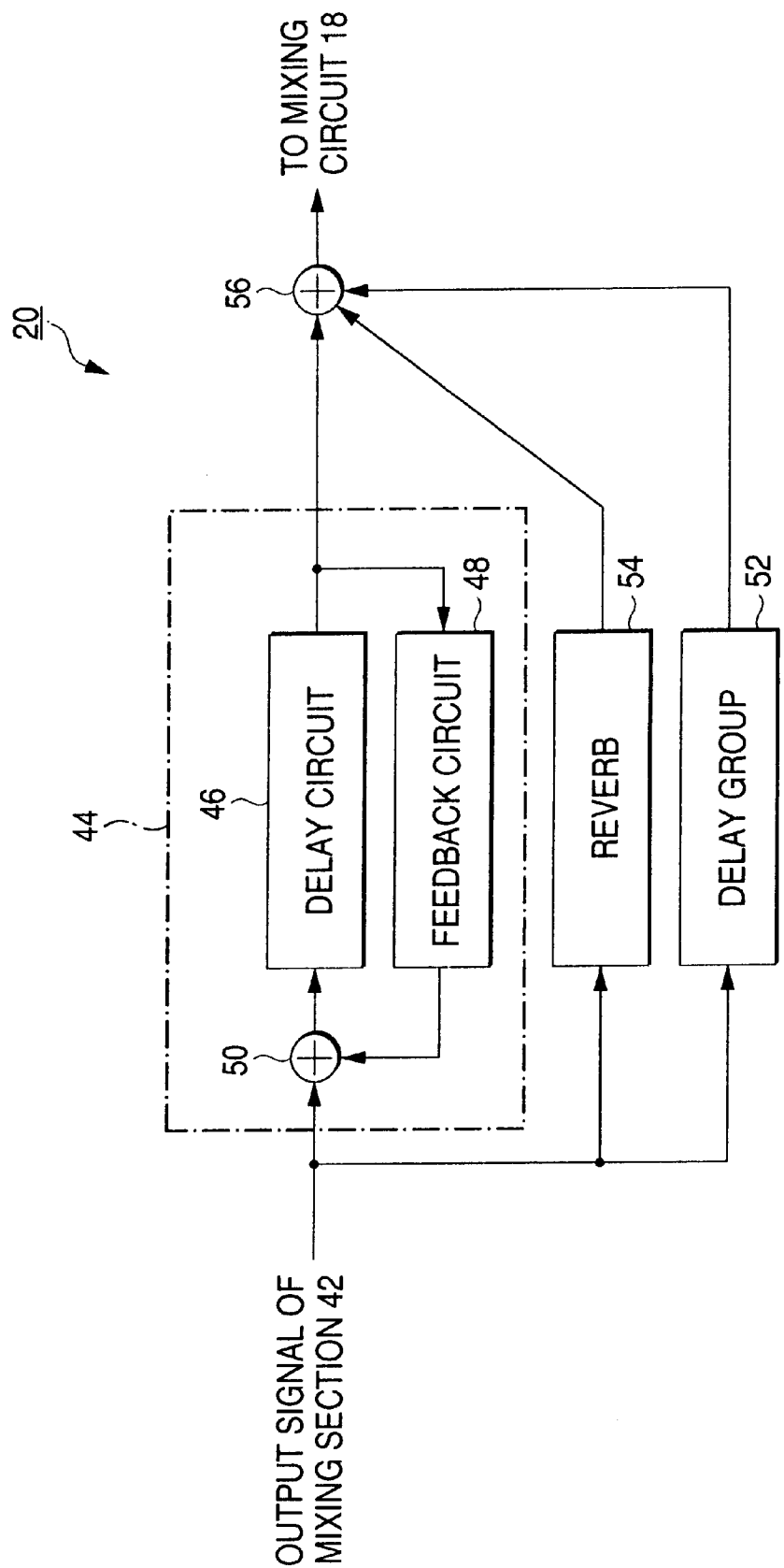
FIG. 3 is a block diagram showing a specific example of the echo signal generating circuit 20 of FIG. 1.

FIG. 3 shows an example of the configuration of the echo signal generating circuit 20. The output signal of the mixing section 42 is supplied to a repeat echo circuit 44, delayed by a delay circuit 46, and then fed back to the input of the delay circuit 46 via a feedback circuit 48 and an adding circuit 50, thereby producing a usual echo signal. A delay group 52 is configured by plural delays which are connected in parallel, or one delay in which plural output taps having different delay times are disposed. The delay group receives the output signal of the mixing section 42, and outputs plural delayed signals corresponding to the early reflected sound. A reverb 54 is a usual reverberation circuit which is configured by a delay circuit and a feedback circuit, receives the output signal of the mixing section 42, and outputs reverberation sound corresponding to rear reverberation sound. The output signals of the repeat echo circuit 44, the delay group 52, and the reverb 54 are mixed with one other by a mixing circuit 56, and the mixed signal is output as an echo signal. Although the input of the echo signal generating circuit 20 is monaural, the input is converted into two right and left channels by the reverb 54 of FIG. 3, and the like, and the two channel signals are then output.

In accordance with the instructed echo kind, the echo signal generating circuit 20 of FIG. 3 can turn on/off the delay group 52, and change the delay time of the delay circuit 46, the feedback gain of the feedback circuit 48, the delay time and gain of the delay group 52, and the delay time and feedback gain of the reverb 54, thereby changing parameters of the echo signal. When a variable gain circuit (not shown) is disposed in an output circuit of the mixing circuit 56, the output level (echo level) of the whole echo signal can be changed.

Referring to FIG. 1, the mixing circuit 18 mixes the generated echo signal with the signal of the mixing circuit 16 to which the echo is not added, and outputs the mixed signal as a final signal of the singing sound. The mixing circuit 22 mixes the signal of the singing sound with the signal of the accompaniment sound. An output signal of the mixing circuit 22 is amplified by the amplifier 24 and the amplified signal is reproduced by the loudspeaker 26.

In response to an operation of the user, the effect operating section 28 (corresponding to the effect on/off instructing section, the effect kind instructing section, or the effect level instructing section) conducts various instruction operations such as the on/off state of each effect, selection of the kind of effect (an effect mode), and adjustment of the additional amount of the effect (a production amount of the effect). For example, the effect kinds include the harmonizing function, the doubling function, the voice changing function, the virtual duet function, and the assist function, as described above. The additional amount of the effect corresponds, for example, to the volume of an effect signal in the harmonizing function, the doubling function, or the like. When the number of parts to be added can be selected in the harmonizing function (in response to a selection operation of the user, for example, among four voice parts in total consisting of two upper voice parts with respect to the part of the singer (the main melody) and two lower voice parts, arbitrary one to four voice parts to be added (two to five voice parts including the main melody) are arbitrarily instructed). The number of parts to be added corresponds to the additional amount of the effect. When the number of corrected sounds which are to be superimposed on the voice of the singer can be selected in the doubling function, the number of superimposed corrected sounds corresponds to the additional amount of the effect.

The effect control information extracting circuit 30 extracts effect control information which is contained, for example, in music piece data as note information of a MIDI signal. For example, the effect control information includes main melody (guide melody) information used in the assist function, melody information of a part to be added in the harmonizing function, melody information of each part used in the virtual duet function, etc. In response to an operation of the user, the echo operating section 34 (corresponding to the kind instructing section and the echo level instructing section) conducts various instruction operations such as the on/off state of each echo, selection of the kind of echo (an echo mode), and adjustment of the additional amount of the echo.

A controlling circuit 58 controls the effect adding section 38 and the echo adding section 40 in accordance with an operation and effect control information in the effect operating section 28 and an operation in the echo operating section 34. The details of the controls conducted by the controlling circuit 58 will be described.

(1) Control Based on the Operation in the Effect Operating Section 28

(a) Control Based on On/Off State of Effect

When the effect is turned on, the dry muting circuit 12 is turned on/off in accordance with the kind of effect, and the effect signal generating circuit 14 generates and outputs an effect signal. When the effect is turned off, the dry muting circuit 12 is turned off and the effect signal generating circuit 14 does not generate an effect signal. In the case in which the effect is off, the mixing section 42 outputs the original microphone signal as it is (100%).

(b) Control Based on Kind of Effect

When the effect is turned on, the following control is conducted in accordance with the kind of effect. In the case of the harmonizing function, the dry muting circuit 12 is turned off, and the effect signal generating circuit 14 generates a signal of the part to be added and outputs the generated signal. The mixing section 42 mixes the signal of the part to be added with the original signal at a mixing ratio which is previously set for the harmonizing function. In the case of the doubling function, the dry muting circuit is turned off, and the effect signal generating circuit 14 generates a signal which is obtained by correcting the original signal and outputs the corrected signal. The mixing section 42 mixes the corrected signal with the original signal at a mixing ratio which is previously set for the doubling function. In the case of the voice changing function, the dry muting circuit 12 is turned on, and the effect signal generating circuit 14 generates a pitch-converted signal. At this time, the mixing section 42 outputs the effect signal at a ratio of 100%. In the case of the virtual duet function, the dry muting circuit 12 is turned on, and the effect signal generating circuit 14 generates a pitch-nonconverted signal and a pitch-converted signal. In accordance with the male voice part, the female voice part, or the mixed voice part, a signal of the corresponding part is output with the progress of the music piece. At this time, the mixing section 42 outputs the effect signal at a ratio of 100%. For the mixed voice part, the mixing ratio of the effect signal may be reduced. In the case of the assist function, the dry muting circuit 12 is turned on, and the effect signal generating circuit 14 generates a signal which is obtained by correcting the microphone signal and outputs the corrected signal. At this time, the mixing section 42 outputs the effect signal at a ratio of 100%.

In place of or in addition to the change of the mixing ratio by the mixing section 42, the parameters of the echo signal generating circuit 20 may be changed (when the mixing ratio is increased, the values of the parameters (the delay time, the feedback gain, the output level, and the like) may be reduced).

(c) Control Based on an Additional Amount of Effect

The number of output routes of the effect signal generating circuit 14, and the volume level of the output are controlled in accordance with instructions on the volume level of the effect signal, the number of parts to be added in the harmonizing function, and the number of superimposed corrected sounds in the doubling function. At this time, the mixing ratio of the effect signal in the mixing section 42 is changed as required. For example, the mixing ratio of the effect signal is made lower as the number of parts to be added in the harmonizing function or that of superimposed corrected sounds in the doubling function is made larger. As the volume level of the effect signal is made higher, the mixing ratio of the effect signal is made lower. In place of or in addition to the change of the mixing ratio by the mixing section 42, the parameters of the echo signal generating circuit 20 may be changed (when the mixing ratio is increased, the values of the parameters of the echo may be reduced).

(2) Control Based on Effect Control Information

In the case of the harmonizing function, the virtual duet function, or the assist function, the effect signal generating circuit 14 generates a corresponding effect signal on the basis of the effect control information, and outputs the generated signal. In the case of the harmonizing function, the mixing ratio of the effect signal in the mixing section 42 and/or the parameters of the echo signal generating circuit 20 are changed in accordance with the pitch of the melody of the part to be added and the number of simultaneously produced sounds which are given by the effect control information. In a melody portion where the number of simultaneously produced sounds of the part to be added is large, for example, the mixing ratio of the effect signal is reduced and/or also the parameters of the echo signal generating circuit 20 are reduced.

(3) Control Based on Operation of Echo Operating Section 34

(a) Control Based on the On/Off State of Echo

When the echo is turned on, the echo signal generating circuit 20 generates an echo signal and outputs the signal. When the echo is turned off, the echo signal generating circuit 20 does not output the echo signal.

(b) Control Based on Kind of Echo

When the echo is turned on, the echo signal generating circuit 20 generates an echo signal of corresponding contents in accordance with the kind of the echo, and outputs the echo signal. In the case where an effect such as the harmonizing function or the doubling function is selected at this time, the mixing ratio and the values of the echo parameters may be changed according to the kind of echo. Specifically, in the case of an echo of a kind in which the parameter value is large (i.e., the echo is strong), the mixing ratio of the effect signal in the mixing section 42 is reduced and/or the parameters of the echo signal generating circuit 20 are reduced from the initial set values (set values at which a sufficient effect is attained even when the effect is not used).

(c) Control Based on Echo Level

In the case in which an effect such as the harmonizing function or the doubling function is selected, the mixing ratio and the value of the echo parameter may be changed in accordance with the instructed value of the echo level. When the echo level is instructed so as to have a large value, the mixing ratio of the effect signal in the mixing section 42 is reduced and/or the parameters of the echo signal generating circuit 20 are reduced from the initial set values.

Table 1 below shows an example of setting the mixing ratio in the mixing section 42 in the case where both an effect and an echo are to be added and the additional amount of the echo is changed by changing the mixing ratio of the mixing section 42 (while the echo parameters are not changed from the initially set values). In this setting, the mixing ratio (it is assumed that the level before mixing is 100%) is set in accordance with the kind of effect.

TABLE 1

| Kind of effect | Ratio of original signal | Ratio of effect signal |
| --- | --- | --- |
| Harmonizing function | 100% | 0% |
| Doubling function | 100% | 0% |
| Voice changing function | 0% | 100% |
| Virtual duet function | 0% | 100% |
| Assist function | 0% | 100% |

For the harmonizing function, the mixing ratio may be changed in accordance with the number of parts to be added. Table 2 shows an example of such a setting (an example in which, when all the parts to be added are summed up, the ratio of the effect signal is 100%).

TABLE 2

| Kind of effect | Number of parts to be added | Ratio of original signal | Ratio of effect signal |
| --- | --- | --- | --- |
| Harmonizing function | one voice part | 50% | 100% |
| Harmonizing function | two voice parts | 50% | 50% |
| Harmonizing function | three voice parts | 50% | 33% |
| Harmonizing function | four voice parts | 50% | 25% |

In the case in which an echo of a kind in which the degree of the echo is weak is used, the ratio of the effect signal may be increased. In the case in which the device is configured so that the ratio of the effect signal is changed by downloading, when a preferable setting is found in future, the setting can be easily changed to the more preferable one.

In the embodiment described above, the second mixing circuit is configured so that the dry signal (the original microphone signal) and the effect signal are added together (the mixing circuit 16) and the added signal and the echo signal are then added together (the mixing circuit 18). Alternatively, the second mixing circuit may be configured so that the dry signal and the echo signal are added and then the effect signal is then added, then the effect signal and the echo signal are added and then the dry signal is then added. Alternatively, the dry signal, the effect signal, and the echo signal may be added together at one time.

What is claimed is:

1. A device for processing a microphone signal of a karaoke apparatus, comprising:

an effect adding section which conducts an effect adding process wherein a signal in which a pitch is changed with respect to an input microphone signal or a signal which is appropriately corrected with respect to the input microphone signal is produced, the signal is added to the microphone signal, and a result of the addition is output;

an echo adding section which conducts an echo adding process wherein an echo is added to an output signal of the effect adding section, and a result of the addition-is output;

an effect on/off instructing section that instructs whether the microphone signal undergoes the effect adding process and then enters the echo adding section, or directly enters the echo adding section without undergoing the effect adding process; and a controlling circuit which, in accordance with effect on/off instructions of the effect on/off instructing section, turns on/off the effect adding process of the effect adding section, and, when an effect on instruction is given, reduces an additional amount of the echo which is to be added by the echo adding section, as compared with the case where an effect off instruction is given.

2. The device of claim 1, wherein the controlling circuit conducts a control of, in accordance with effect control information which is automatically supplied with the progress of accompaniment sound, changing contents of the effect which is added by the effect adding section, and, in accordance with the effect control information, changing an additional amount of the echo which is to be added by the echo adding section.

3. The device of claim 1, further comprising an effect level instructing section that instructs an additional amount of the effect which is to be added by the echo adding section, wherein the controlling circuit conducts a control of, in accordance with the additional amount of the effect which is instructed by the effect level instructing section, changing the additional amount of the effect which is to be added by the effect adding section, and also the additional amount of the echo which is to be added by the echo adding section.

4. The device of claim 1, wherein the change of the additional amount of the echo by the controlling circuit is conducted by changing one or more of an input level of the output signal of the effect adding section which is to be supplied to the echo adding section, and a delay time, a feedback gain, and an output level of the echo adding section.

5. A device for processing a microphone signal of a karaoke apparatus, comprising:

an effect adding section which conducts an effect adding process wherein a signal in which a pitch is changed with respect to an input microphone signal or a signal which is appropriately corrected with respect to the input microphone signal is produced, the signal is output in place of the original microphone signal, the signal is added to the microphone signal, and a result of the addition is output;

an echo adding section which conducts an echo adding process wherein an echo is added to an output signal of the effect adding section, and a result of the addition is output;

an effect kind instructing section that instructs a kind of effect which is to be added by the effect adding section; and a controlling circuit which, in accordance with the effect kind which is instructed by the effect kind instructing section, sets the effect which is to be added by the effect adding section to have corresponding contents, and, in accordance with the instructed effect kind, changes an additional amount of the echo which is to be added by the echo adding section.

6. The device of claim 5, wherein, when the effect kind instructing section instructs an effect of adding a signal in which a pitch is changed to the original microphone signal and outputting a result of the addition, the controlling circuit reduces an additional amount of the echo which is added by the echo adding section, as compared with the case where an effect of outputting the pitch-changed signal in place of the original microphone signal is instructed.

7. The device of claim 5, wherein the controlling circuit conducts a control of, in accordance with effect control information which is automatically supplied with the progress of accompaniment sound, changing contents of the effect which is added by the effect adding section, and, in accordance with the effect control information, changing an additional amount of the echo which is to be added by the echo adding section.

8. The device of claim 5, further comprising an effect level instructing section that instructs an additional amount of the effect which is to be added by the echo adding section, wherein the controlling circuit conducts a control of, in accordance with the additional amount of the effect which is instructed by the effect level instructing section, changing the additional amount of the effect which is to be added by the effect adding section, and also the additional amount of the echo which is to be added by the echo adding section.

9. The device of claim 5, wherein the change of the additional amount of the echo by the controlling circuit is conducted by changing one or more of an input level of the output signal of the effect adding section which is to be supplied to the echo adding section, and a delay time, a feedback gain, and an output level of the echo adding section.

10. A device for processing a microphone signal of a karaoke apparatus, comprising:

a dry muting circuit which enables or disables an input microphone signal to pass through the dry muting circuit;

an effect signal generating circuit which is connected in parallel with the dry muting circuit, and which generates an effect signal for the microphone signal;

a first mixing circuit which mixes signals on input and output sides of the effect signal generating circuit with each other, at a variable mixing ratio;

an echo signal generating circuit which generates an echo signal from an output signal of the first mixing circuit;

a second mixing circuit which mixes an output signal of the dry muting circuit, an output signal of the effect signal generating circuit, and an output signal of the echo signal generating circuit with one another;

an effect kind instructing section that instructs a kind of an effect; and a controlling circuit which, in accordance with the effect kind which is instructed by the effect kind instructing section, turns on/off the dry muting circuit and sets contents of the effect signal which is to be generated by the effect signal generating circuit, and, in accordance with the instructed effect kind, changes the mixing ratio of the first mixing circuit.

11. The device of claim 10, wherein, when an effect to be realized in a state where the dry muting circuit is turned off to enable the microphone signal to pass through the dry muting circuit is instructed by the effect kind instructing section, the controlling circuit conducts a control of lowering the ratio of the effect signal which is to be mixed by the first mixing circuit, as compared with the case where an effect to be realized in a state where the dry muting circuit is turned on to disable the microphone signal from passing through the dry muting circuit is instructed.

12. The device of claim 10, wherein the controlling circuit conducts a control of, in accordance with effect control information which is automatically supplied with the progress of accompaniment sound, changing contents of the effect signal which is generated by the effect signal generating circuit, and, in accordance with the effect control information, changing the mixing ratio of the first mixing circuit.

13. The device of claim 10, further comprising an echo kind instructing section that instructs a kind of the echo signal to be generated by the echo signal generating circuit;

wherein the controlling circuit conducts a control of, in accordance with the kind of the echo which is instructed by the echo kind instructing section, setting the echo signal which is to be generated by the echo signal generating circuit to corresponding contents, and, in accordance with the instructed kind of the echo, changing the mixing ratio of the first mixing circuit.

14. The device of claim 10, further comprising an echo level instructing section that instructs a level of the echo signal to be generated by the echo signal generating circuit;

wherein the controlling circuit conducts a control of, in accordance with the echo level which is instructed by the echo level instructing section, setting an output level of the echo signal which is to be generated by the echo signal generating circuit to a corresponding level, and, in accordance with the instructed echo level, changing the mixing ratio of the first mixing circuit.

15. The device of claim 10, further comprising an effect level instructing section that instructs a generating amount of the effect signal which is to be generated by the effect signal generating circuit;

wherein the controlling circuit conducts a control of, in accordance with the generating amount of the effect signal which is instructed by the effect level instructing section, changing a generating amount of the effect signal which is to be generated by the effect signal generating circuit, and, in accordance with the instructed generating amount of the effect signal, changing the mixing ratio of the first mixing circuit.

* * * * *